United States Patent
Dona et al.

[11] Patent Number: 6,124,975
[45] Date of Patent: Sep. 26, 2000

[54] LENTICULAR SHEET

[75] Inventors: Marinus J. J. Dona; Derk Visser, both of Eindhoven, Netherlands

[73] Assignee: U.S. Philips Corporation, New York, N.Y.

[21] Appl. No.: 09/187,876

[22] Filed: Nov. 6, 1998

Related U.S. Application Data

[63] Continuation-in-part of application No. 09/157,188, Sep. 18, 1998.

[51] Int. Cl.$^7$ .................................................. G02B 27/10
[52] U.S. Cl. ............................................ 359/626; 359/619
[58] Field of Search .................................. 359/621, 622, 359/623, 624, 625, 626, 619

[56] References Cited

U.S. PATENT DOCUMENTS

| | | | |
|---|---|---|---|
| 2,951,419 | 9/1960 | Lemelson | 359/619 |
| 3,353,897 | 11/1967 | Lemelson | 359/621 |
| 3,357,772 | 12/1967 | Rowland | 350/167 |
| 3,357,773 | 12/1967 | Rowland | 350/167 |
| 3,421,805 | 1/1969 | Rowland | 350/167 |
| 5,363,240 | 11/1994 | Miyahsita | 359/625 |
| 5,629,796 | 5/1997 | Shanks | 359/463 |

FOREIGN PATENT DOCUMENTS

0156430A1  10/1985  European Pat. Off. .

*Primary Examiner*—Ricky Mack
*Attorney, Agent, or Firm*—David R. Treacy

[57] ABSTRACT

A transparent sheet is provided on both sides with a lenticular array (4,). The embossments (7) of at least one of the arrays (6) has a cross-section showing at least two bends (11–14), thereby improving the visibility of the Moiré pattern formed by the two arrays. The sheet may be used as an anti-counterfeit mark.

14 Claims, 3 Drawing Sheets

LENTICULAR SHEET

This is a CIP of Ser. No. 09/157,188 filed Sep. 18, 1998.

BACKGROUND OF THE INVENTION

The invention relates to a transparent sheet comprising two lenticular arrays of differing pitch on opposite surfaces of the sheet, each array comprising a series of emmbossments. The invention also relates to an object comprising such a transparent sheet, a method, a single mould and a set of moulds for manufacturing said transparent sheet.

A sheet according to the opening paragraph is known from U.S. Pat. No. 3,357,773. Both surfaces of the known plastic sheet are embossed with a regular array of convex micro-lenses. The spacing between the centres of the micro-lenses in both arrays differs by a small amount. The sheet provides different Moiré patterns to an observer depending on the amount by which the arrays are out of registry in one direction or in two directions in the plane of the sheet. The visual pattern stands out of the sheet and includes three-dimensional depressions or projections of circular or oval configuration and varying size.

SUMMARY OF THE INVENTION

It is an object of the invention to provide a lenticular sheet having an improved visibility of the Moiré pattern and an improved depth perception.

The object is achieved when, according to the invention, the transparent sheet is characterized in that a cross-section of the embossments of at least one of the arrays in a plane perpendicular to the corresponding surface comprises at least two discontinuities. A discontinuity in the cross-section is a relatively short length of the border line in the cross-section of the embossment where the direction of reflection of incident light changes. A discontinuity is relatively short if the length of the discontinuity in the cross-section is shorter than 40% of the length of the border line of the embossment. The perimeter discontinuities in the cross-sections at locations where the embossments extend from or into the sheet are not to be included in the number of other discontinuities which will be referred to as "further discontinuities". The changes in reflection due to the further discontinuities become visible as a distinctive structure in the Moiré pattern, thereby increasing the visibility of the pattern and adding to the depth perception. A further discontinuity may be a small region of the embossment that reflects incident light diffusely, e.g. by a rough surface texture. A further discontinuity may also be a small region presenting planes under different angles to incident light, such as a groove or hill having two or more sides; the sides may be flat or curved.

The further discontinuity preferably extends around the embossment in the form of the edge of a closed band, thereby forming closed bands within the image of an embossment present in the Moiré pattern. If the embossment is spherical, one further discontinuity preferably bounds a circular band on the embossment, lying in a plane parallel to the surface of the sheet. The bands in the image enhance the visibility of the embossment image in the Moiré pattern.

A single embossment has preferably lens-like properties; this should apply to at least the majority of embossments of one or both lenticular arrays.

The further discontinuities are preferably sharp bends. The sharp bends allow more variation of the curvature of the surfaces bounding the embossments, thereby improving to an unexpectedly large extent the reflection and refraction of incident light, which increases the visibility of the pattern. A sharp bend is an abrupt, local change in radius of curvature, substantially larger than changes in the radius of curvature in other parts of the cross-section. A sharp bend of an embossment extends preferably along a line, which may run parallel to the surface of the sheet and which may be straight or curved.

In a preferred embodiment of the transparent sheet the cross-section comprises a first line having a first radius of curvature and a second line having a second, different radius of curvature. The cross-section may comprise a straight line between the two curved lines, the two curved lines having equal or different radii of curvature. An embossment provided with these features may have the form of a spherical zone having a first radius and a spherical segment having a second radius smaller than the first radius. The flat part of the segment is arranged on a smaller one of two flat parts of the zone. A spherical zone is defined as a part of a sphere having two flat parts, located between two planes having a constant but different values of z, where the sphere is regarded as centred on a three-dimensional coordinate system xyz. A spherical segment is defined as a part of a sphere having one flat part, located on one side of a plane having a constant value of z. Relatively steep edges of the spherical zone may reflect light by total internal reflection, giving a locally strongly increased reflection of the sheet, thereby enhancing the visibility of the structure. If a single, steep-edged spherical segment were used as an embossment instead of the shape according to the invention, the height of the embossment would be relatively large, rendering the manufacture of the mould for forming the sheet and the moulding process more difficult.

The embossments may be arranged in a rectangular array. The embossments are preferably arranged in a hexagonally close-packed array, reducing the area between the embossments to a minimum.

The sheet may be provided on one surface or on each surface with an array having embossments with two further discontinuities. In the former case the array having embossments without two further discontinuities preferably comprises lens-like embossments. The focal length of these embossments is preferably substantially equal to the thickness of the sheet.

When an array is provided with an at least partially reflective layer, the reflection of the sheet is enhanced and the visibility of the Moiré pattern increased. The improvement is more pronounced when the array with embossments having two further bends is provided with the reflection layer than when the array with embossments without further bends is provided with a reflection layer. The use of one or two reflection layers on the sheet is particularly advantageous when the sheet is embedded in a material having a refractive index similar to that of the sheet, because in that case the magnitude of the reflection is no longer directly dependent on the refractive index difference between the sheet and the embedding material.

The array facing the viewing side of the sheet is preferably protected against environmental influences by a protective layer. If this layer has a refractive index different from that of the sheet material, the optical contrast of the array, required for forming the Moiré pattern, is preserved.

One or both surfaces of the sheet may be provided with an image. The image may also be arranged within the body of the sheet. When arranged on the viewing side of the sheet or within the body, the image is preferably partly transparent to allow the formation of the Moiré pattern at the position of the image. The sheet itself may be a projection slide carrying an image. Alternatively, the sheet may be used as an image frame. A picture or a projected image surrounded by and coplanar with such a frame will appear to a binocular observer as not coplanar, enhancing the observer's depth perception of the picture or image.

A further aspect of the invention relates to an object provided with a transparent sheet according to the invention. The purpose of the sheet may be to improve the reflectivity of the object because the combined arrays produce a significant degree of retroflection for a wide range of angles of incidence and also to provide light scattering and highlights over a wide angular range. The purpose may also be decorative in view of the wide range of visual patterns that can be formed by the sheet. The sheet may be an integral part of the object. It may form for instance a part of a protective casing, thereby combining a structural and a decorative function.

In a special embodiment of the object according to the invention, the Moiré pattern formed by the sheet is characteristic for a proprietor or manufacturer of the object. For example, a pattern on a cartridge of a record carrier may be characteristic for the manufacturer of the cartridge or the record carrier or for the copyright holder of the information stored on the record carrier. The excellent visibility of the pattern aids the discriminating eye of a consumer to distinguish an authentic object from a counterfeit one and allows a policing authority to definitely authenticate an object. Since copying of the arrays on the sheet is difficult, it is unlikely that the copied sheet has the same positional relation between the two arrays as the authentic sheet. The ensuing change in the Moiré pattern can be observed by the naked, unskilled eye.

In a preferred embodiment the sheet is attached to a member of the object by a layer of adhesive. The adhesive bonds the sheet such that, if an authentic sheet is removed from the member for counterfeit purposes, the array adjacent the adhesive will be damaged. A copy of the damaged array will show a Moiré pattern which deviates noticeably from the authentic pattern.

A further aspect of the invention relates to a mould for use in the manufacture of a transparent sheet comprising a lenticular array. The mould comprises a bottom provided with a series of embossments in a pattern of the lenticular array, the a cross-section of the embossments in a plane perpendicular to the bottom comprising at least two further discontinuities. The further discontinuities are preferably bends.

The invention also relates to a set of moulds for use in the manufacture of a transparent sheet comprising two lenticular array on opposite surfaces of the sheet. At least one of the moulds comprises a bottom provided with a series of embossments in a pattern of the lenticular array, the a cross-section of the embossments in a plane perpendicular to the bottom comprising at least two further discontinuities. The further discontinuities are preferably bends.

A further aspect of the invention relates to a method of manufacturing a transparent sheet comprising a lenticular array by using a mould. The mould comprises a bottom provided with a series of embossments in a pattern of the lenticular array and is characterized in that the a cross-section of the embossments in a plane perpendicular to the bottom comprises at least two further discontinuities.

BRIEF DESCRIPTION OF THE DRAWING

The objects, advantages and features of the invention will be apparent from the following more particular description of preferred embodiments of the invention as illustrated in the accompanying drawings, wherein.

DESCRIPTION OF THE PREFERRED EMBODIMENTS

Figure 1:
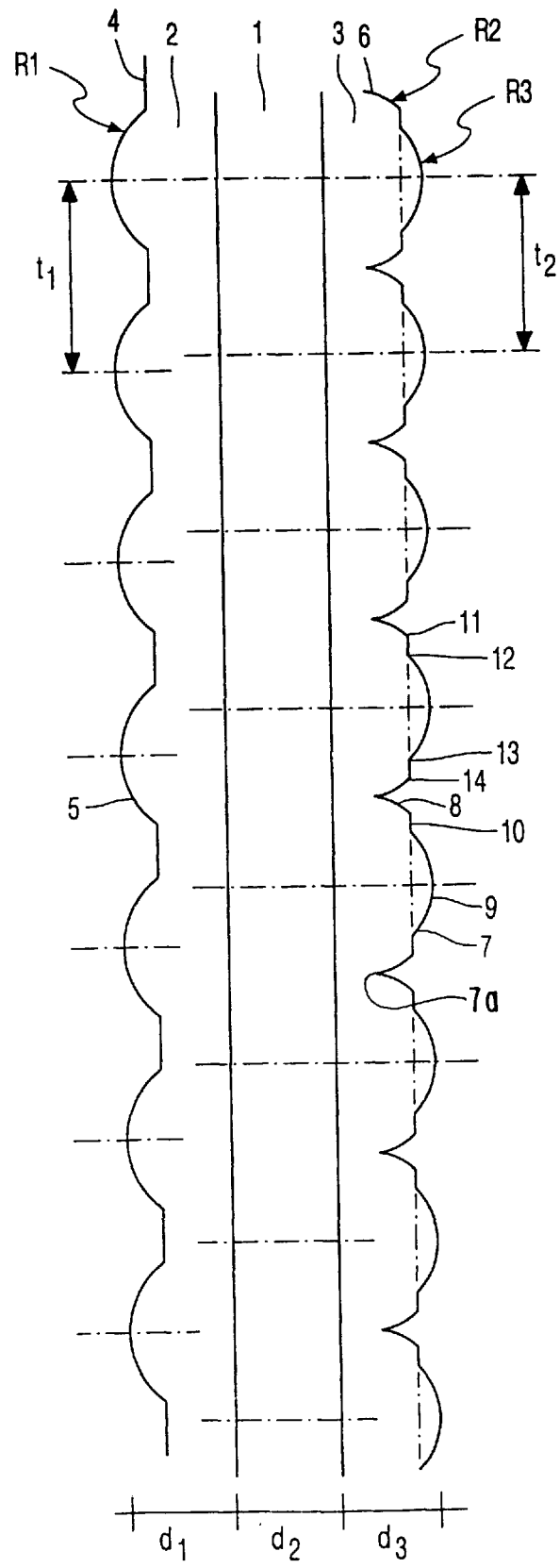
FIG. 1 shows a cross-section of a lenticular sheet according to the invention.

FIG. 1 shows a cross-section of a lenticular sheet according to the invention. The body of the sheet comprises a central layer 1 and two layers 2, 3 on each side. The thickness $d_1$, $d_2$ and $d_3$ of layers 1, 2 and 3 is 150 μm each. Layer 2 is provided with a lenticular array 4, having a large number of regularly spaced embossments 5, each in the form of a convex protrusion. Preferably, the protrusion has the form of a convex lens. The radius $R_1$ of the lens is 150 μm and the spacing $t_1$ of the centres of the lenses is 336 μm. Layer 3 is also provided with a lenticular array 6, having a large number of regularly spaced embossments 7 extending outward from a perimeter transition 7a. Each embossment 7 has the shape of a spherical zone 8 and a coaxial spherical segment 9. In a cross-section of the embossment the zone appears as two curved lines indicated in the Figure by the reference numeral 8, and the segment appears also as a curved line indicated by the reference numeral 9. Zone 8 is part of a sphere having a radius $R_2$ of 250 μm. Segment 9 is part of a sphere having a radius $R_3$ of 150 μm. In a special embodiment the two radii are of equal length. Zone 8 and segment 9 are connected by a flat annular area 10, appearing in the Figure as two straight lines 10 between the two curved lines 8 and 9. The cross-section of the embossment shows four sharp bends 11–14 which are further discontinuities at the transition from zone 8 to flat area 10, from flat area 10 to segment 9, from segment 9 to flat area 10 and from flat area 10 to zone 8, respectively. The spacing $t_2$ of the centres of the embossments 8 is 346 μm. The zones of neighbouring embossments may touch. The zones may be positioned so close as to touch along a line. The resulting small amount of space between embossments 8 contributes to the vividness of the Moiré pattern.

The shape of embossment 5, zone 8 and/or segment 9 need not be spherical, but may be for instance parabolic.

The radius and spacing of the embossments are preferably chosen in dependence on the distance from which the sheet is normally observed. When the observation distance is less than one meter, the spacing should be in a range from 1 to 1000 μm. When the observation distance is more than one meter, the spacing should be in a range from 1 mm to 100 mm. The radius should increase proportionally to the spacing.

The embossments may cover the entire area of the surface on which the pattern is provided, or the embossments may be spaced apart to leave unembossed areas between them. The embossments may be arranged in any pattern in the arrays, such as a rectangular or triangular pattern. An hexagonal pattern is preferred because of its close packing. The above spacing of the lenses is in the nearest neighbour direction.

Since the embossments of arrays 4 and 6 are out of register by an amount of $t_2-t_1$ the Moiré pattern will have a period of $t_1t_2/|t_1-t_2|$ which is equal to about 11 mm for the lenticular sheet shown in FIG. 1. If the embossments are in register in one direction and out of register in another direction, the Moiré pattern will only show a variation in the latter direction. If the difference in spacing between the two arrays differs in different directions, the Moiré pattern will show different periods in these directions. If the focal length of embossment 5 is of the order of the thickness of the sheet, the Moiré pattern will be a repetition of enlarged images of embossment 8 when the sheet is viewed from the side of array 4, giving an impression of bubbles. For the present sheet, the embossment diameter of 346 μm will be imaged to a bubble size of 11 mm. The image will be circular or elliptical depending on the difference in spacing of the arrays in the various directions in the plane of the sheet. In binocular vision the pattern of bubbles appears to lie in a plane that is not coplanar with the plane of the sheet. The sheet of FIG. 1 shows a height difference of about 5 mm between the plane of the pattern and the plane of the sheet.

The Moiré pattern may be viewed in transmission and in reflection from either side of the sheet. The structure of zone 8 and segment 9 is most clearly seen when the sheet is observed from the side of array 4.

Figure 2:
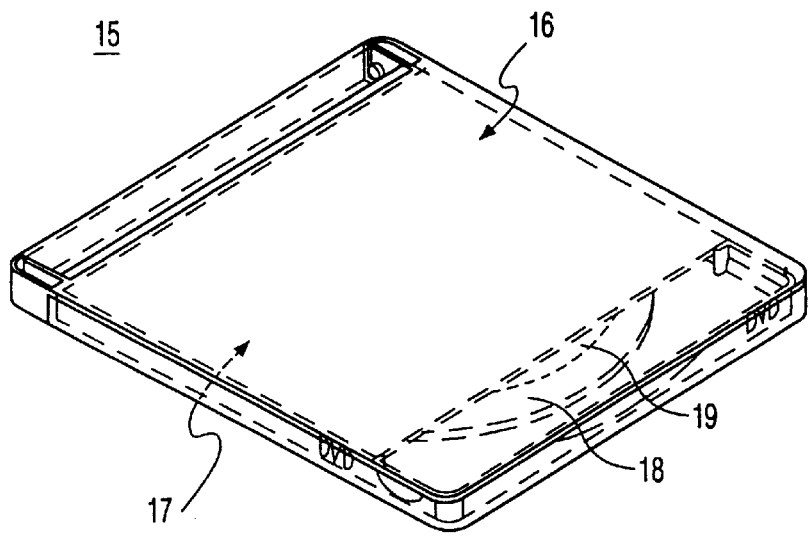
FIG. 2 shows an object provided with a lenticular sheet, and FIG. 3A and B show two structures with embedded lenticular sheets.

FIG. 2 shows a cartridge 15 provided with a lenticular sheet according to the invention. The cartridge, as known per se from inter alia U.S. Pat. No. 4,874,085, has a lid member 16 and a base member 17 having means for holding a record carrier 18. The record carrier may be of any type, such as a magnetic tape, optical tape, magnetic disk or optical disk. The record carrier shown in the Figure is a disc-shaped optical record carrier such as a CD or a DVD. Lid member 16 is made of a lenticular sheet according to the invention. Likewise, base member 17 may be made of a lenticular sheet, or parts of the cartridge such as the side walls of the lid or base member may be manufactured from lenticular sheet. Record carrier 18 is provided with a label 19 comprising a lenticular sheet.

Figure 3A:
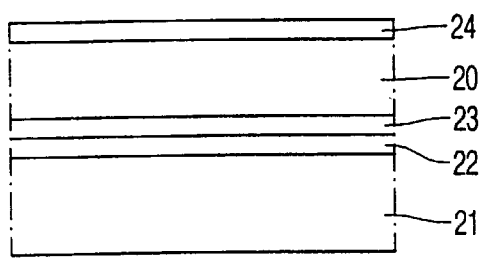

The use of lenticular sheets may be purely decorative. The use may also be for anti-counterfeit purposes. The copying of the sheet may be made harder if the sheet is embedded in a body. FIG. 3A shows a cross-section of a structure in which a lenticular sheet according to the invention has been embedded. A lenticular sheet according to the invention is attached to an object 21 by means of an adhesive layer 22. A reflective layer 23 in between lenticular sheet 20 and adhesive layer 22 provides for reflection of light. The embossments of the lenticular sheet have not been shown in the Figure for sake of clarity. The surface of lenticular sheet 20 facing away from reflective layer 23 is covered by a transparent protective layer 24. The protective layer is made of a material having a refractive index different from that of the lenticular sheet in order to reflect light on the interface between the sheet and the layer. Protective sheet 24 protects the lenticular sheet from environmental influences, in particular mechanical wear and staining.

Figure 3B:
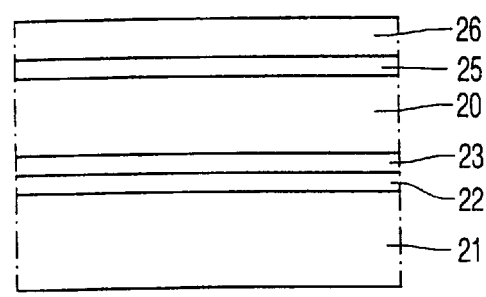

FIG. 3B shows an alternative embodiment of an embedded lenticular sheet. Instead of protective layer 24, a partially reflective layer 25 is provided on lenticular sheet 20. A layer 26 is applied on reflective layer 25. Layer 26 may be a relatively thin protective layer or a transparent layer having mechanical strength. The refractive index of layer 26 may be chosen more freely than that of protective layer 24. Reflective layer 25 may be a partially transmitting metal layer or a dielectric layer exhibiting the required reflectance. The choice of reflectance of both layers 23 and 25 depends on whether the lenticular sheet is to be viewed in reflection or transmission only or both in reflection and transmission. The choice of reflectance values is also determined by the desired intensity of the Moiré pattern.

Figure 4:
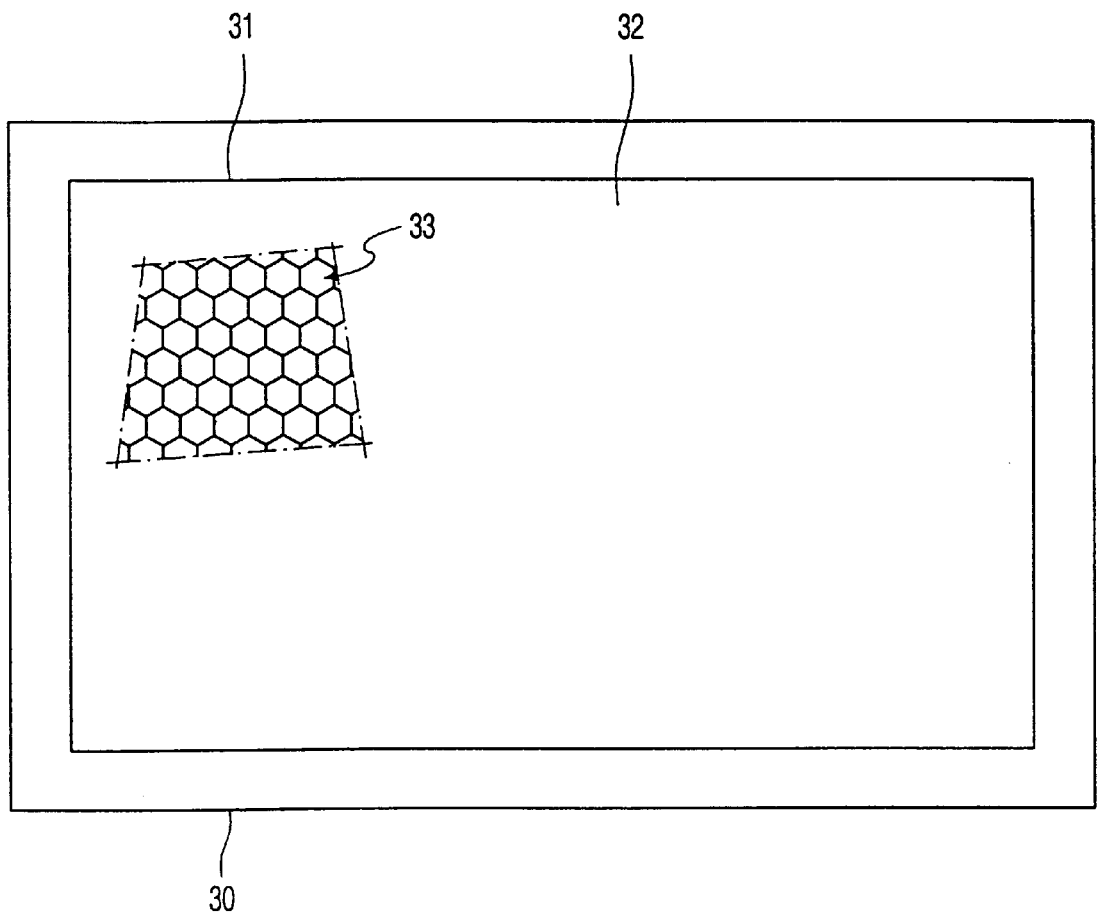
FIG. 4 shows a mould for use in the manufacture of a lenticular sheet.

The lenticular sheet may be manufactured using the replication technique as disclosed in European patent EP 0 156 430. Layer 1, preferably made of a polymer, is covered by a UV-curing lacquer. The lacquer is pressed into the form of an array by a mould bearing the negative shape of array 4. FIG. 4 shows such a mould 30. The mould comprises a mould chamber 31 with a plane bottom 32 in which an embossment 33 is provided, so as to form a hexagonally close-packed two-dimensional pattern. The Figure shows only a part of the embossed area for sake of clarity. The lacquer is cured by irradiation with UV light. After hardening, the lacquer forms layer 2 and the mould is removed. Likewise, layer 3 is formed on layer 1 by a mould having the negative shape of the embossments of layer 3. The two moulds together form a matched set, the embossments of which have well-defined positions. The lenticular sheet may alternatively be made by injection moulding or compression moulding. The embossing process may also consist of rolling one or more ductile transparent sheets between two rollers provided with the embossments according to the invention, as disclosed inter alia in U.S. Pat. No. 3,357,772.

What is claimed is:

1. A transparent sheet comprising a first lenticular array (4) having a first pitch on a first surface of the sheet, said first array comprising a series of first embossments (5), and
    a second lenticular array (6) having a second pitch different from said first pitch on a second surface of the sheet opposite said first surface, said second array comprising a series of second embossments having a given cross-section in a plane perpendicular to the corresponding surface, each second embossment having a perimeter discontinuity where the respective embossment extends from or into the sheet,
    characterized in that in addition to said perimeter discontinuity said given cross-section comprises at least two further discontinuities.

2. A sheet as claimed in claim 1, characterized in that at least one of said further discontinuities is a region of the embossment that reflects incident light diffusely.

3. A sheet as claimed in claim 1, characterized in that said given cross-section comprises a first line (8) having a first radius of curvature ($R_2$) and a second line (9) having a second, different radius of curvature ($R_3$).

4. A sheet as claimed in claim 1, further comprising an at least partially reflective layer (23,25) arranged on one of the arrays.

5. A sheet as claimed in claim 1, characterized in that the sheet is made of a material having a first refractive index and a protective layer (24) having a second, different refractive index arranged on a viewing side of the sheet.

6. A sheet as claimed in claim 1, characterized in that the given cross-section comprises a straight line (10) between a first curved line (8) and a second curved line (9).

7. A sheet as claimed in claim 6, characterized in that said first curved line (8) has a first radius of curvature ($R_2$), and said second curved line (9) has a second, different radius of curvature ($R_3$).

8. An object comprising a transparent sheet as claimed in claim 1, characterized in that said arrays provide a Moiré pattern which is a characteristic for a proprietor or manufacturer of the object.

9. An object comprising a transparent sheet as claimed in claim 1, further comprising an object member (16,17) and a layer of adhesive (22) attaching one surface of the transparent sheet to the object member, said adhesive bonding the sheet such that removal of the sheet from the object member will damage the array adjacent the adhesive.

10. A transparent sheet comprising a first lenticular array (4) having a first pitch on a first surface of the sheet, said first array comprising a series of first embossments (5), and a second lenticular array (6) having a second pitch different from said first pitch on a second surface of the sheet opposite said first surface, said second array comprising a series of second embossments having a given cross-section in a plane perpendicular to the corresponding surface, each second embossment having a perimeter discontinuity where the respective embossment extends from or into the sheet, characterized in that in addition to said perimeter discontinuity said given cross-section comprises at least two sharp bends.

11. A sheet as claimed in claim 10, characterized in that the given cross-section comprises a straight line (10) between a first curved line (8) and a second curved line (9).

12. A sheet as claimed in claim 11, characterized in that said first curved line (8) has a first radius of curvature ($R_2$), and said second curved line (9) has a second, different radius of curvature ($R_3$).

13. An object comprising a transparent sheet as claimed in claim 10, characterized in that said arrays provide a Moiré pattern which is a characteristic for a proprietor or manufacturer of the object.

14. An object comprising a transparent sheet as claimed in claim 10, further comprising an object member (16,17) and a layer of adhesive (22) attaching one surface of the transparent sheet to the object member, said adhesive bonding the sheet such that removal of the sheet from the object member will damage the array adjacent the adhesive.

* * * * *